US012264642B1

(12) United States Patent
Tozzi et al.

(10) Patent No.: US 12,264,642 B1
(45) Date of Patent: Apr. 1, 2025

(54) TOROIDAL VORTEX INDUCTION DIFFUSER

(71) Applicant: Prometheus Applied Technologies, LLC, Fort Collins, CO (US)

(72) Inventors: Luigi P Tozzi, Fort Collins, CO (US); Maria-Emmanuella Sotiropoulou, Fort Collins, CO (US)

(73) Assignee: Prometheus Applied Technologies LLC, Fort Collins, CO (US)

( * ) Notice: Subject to any disclaimer, the term of this patent is extended or adjusted under 35 U.S.C. 154(b) by 0 days.

(21) Appl. No.: 18/960,582

(22) Filed: Nov. 26, 2024

Related U.S. Application Data

(60) Provisional application No. 63/708,588, filed on Oct. 17, 2024, provisional application No. 63/706,490, filed on Oct. 11, 2024.

(51) Int. Cl.
*F02M 35/10* (2006.01)
*F02M 21/04* (2006.01)
*F02M 29/06* (2006.01)
*F02M 35/104* (2006.01)

(52) U.S. Cl.
CPC .... *F02M 35/10262* (2013.01); *F02M 21/042* (2013.01); *F02M 21/045* (2013.01); *F02M 29/06* (2013.01); *F02M 35/104* (2013.01)

(58) Field of Classification Search
CPC ........... F02M 35/10262; F02M 35/104; F02M 35/1211; F02M 35/1216; F02M 21/0218; F02M 21/04; F02M 21/042; F02M 21/045; F02M 29/00; F02M 29/06; F02M 2700/126
See application file for complete search history.

(56) References Cited

U.S. PATENT DOCUMENTS 9,856,835 B1 * 1/2018 Coldren ............. F02M 21/0284
2014/0158079 A1 * 6/2014 Keffer .............. F02M 35/10262
123/184.53

OTHER PUBLICATIONS

Sotiropoulou, E., et al: Enabling Diesel-Like Performance in Heavy Duty H2-ICE via a Sophisticated Combustion System Solution, ATZ live Heavy Duty Engines 2024—MTZ Conference, Germany, 2024.

(Continued)

*Primary Examiner* — Jacob M Amick
(74) *Attorney, Agent, or Firm* — Barcelo, Harrison & Walker LLP

(57) ABSTRACT

In certain embodiments, a PFI diffuser induction device may use toroidal vortex flow to thoroughly mix $H_2$ and air in the intake runner and port of a $H_2$ engine. When $H_2$ enters a stream of air flow in the form of a toroidal vortex, it may tend to swallow the air into the vortex where a low-pressure region may be formed due to the swirling velocity of the vortex, which may be more effective that the typical mixing via conventional injection methods. Engine test measurements show remarkable improvements in engine combustion stability as well as engine efficiency and power output using a counterflow Toroidal Vortex Induction Diffuser to achieve high levels of fuel mixture homogeneity in combustion engines using hard-to-mix fuels like $H_2$, $CH_3OH$, $C_2H_5OH$ and other gaseous and liquid fuels.

19 Claims, 9 Drawing Sheets

(56) References Cited

OTHER PUBLICATIONS

Sotiropoulou, E., et al: Same-Cycle Spark Control: The Future of Hydrogen Engines. 13th Dessau Gas Engine Conference, Dessau, Germany, 2024.
Sotiropoulou, E., et al: Holistic Solution Enabling High Power Density & Efficiency H2-ICE, ATZ live Heavy Duty Engines 2023—MTZ Conference, Germany, 2023.
Sotiropoulou, E., et al: Prechamber Combustion: Enabling the Competitive Carbon-Neutral ICE. In CIMAC Congress, Paper No. 291, Busan, S. Korea, 2023.
Sotiropoulou, E., Tozzi, L., Trapp, C.: Breakthrough in Hydrogen Engine Combustion Enabling Zero Emissions and High Efficiency with Passive Prechamber Technology. In 12th Dessau Gas Engine Conference, Dessau, Germany 2022.
Yasueda, S., Sotiropoulou E., Tozzi, L.: Predicting Autoignition caused by Lubricating Oil in Gas Engines. In CIMAC Congress, Paper No. 37, Shanghai, China, 2013.
Sotiropoulou, et al: Zero Emission—The Evolution from Low Emission Natural Gas to Hydrogen Using a Pre-chamber Spark Plug.. MTZ Worldwide, vol. 2020-6, pp. 46-50, 2020.

* cited by examiner

TOROIDAL VORTEX INDUCTION DIFFUSER

I. CROSS-REFERENCE TO RELATED APPLICATIONS

This application claims priority of U.S. Patent Application No. 63/706,490, entitled "Toroidal Vortex Induction Diffuser," and filed Oct. 11, 2024 and U.S. Patent Application No. 63/708,588, entitled "Toroidal Vortex Induction Diffuser," and filed Oct. 17, 2024. The entirety of the foregoing patent applications is incorporated by reference herein to the extent consistent with the present disclosure.

II. FIELD OF THE INVENTION

The disclosure generally relates to systems and methods for using toroidal vortex induction diffusers in internal combustion engines, and more particularly to methods and systems for using toroidal vortex induction diffusers to achieve high levels of fuel mixture homogeneity in combustion engines using hard-to-mix fuels like Hydrogen ($H_2$), Methanol ($CH_3OH$), Ethanol ($C_2H_5OH$) and other gaseous and liquid fuels.

III. BACKGROUND OF THE INVENTION

The following references describe problems with the state of the art that are more fully described below. These references are incorporated by reference herein to the extent consistent with this disclosure:

[1] Sotiropoulou, E., et al: Enabling Diesel-Like Performance in Heavy Duty $H_2$-ICE via a Sophisticated Combustion System Solution, ATZ live Heavy Duty Engines 2024-MTZ Conference, Germany, 2024.

[2] Sotiropoulou, E., et al: Same-Cycle Spark Control: The Future of Hydrogen Engines. 13th Dessau Gas Engine Conference, Dessau, Germany, 2024.

[3] Sotiropoulou, E., et al: Holistic Solution Enabling High Power Density & Efficiency $H_2$-ICE, ATZ live Heavy Duty Engines 2023-MTZ Conference, Germany, 2023.

[4] Sotiropoulou, E., et al: Prechamber Combustion: Enabling the Competitive Carbon-Neutral ICE. In CIMAC Congress, Paper No. 291, Busan, S. Korea, 2023.

[5] Sotiropoulou, E., Tozzi, L., Trapp, C.: Breakthrough in Hydrogen Engine Combustion Enabling Zero Emissions and High Efficiency with Passive Prechamber Technology. In 12th Dessau Gas Engine Conference, Dessau, Germany 2022.

[7] Yasueda, S., Sotiropoulou E., Tozzi, L.: Predicting Autoignition caused by Lubricating Oil in Gas Engines. In CIMAC Congress, Paper No. 37, Shanghai, China, 2013.

[8] Sotiropoulou, et al: Prechamber Spark Plugs: The Evolution from Low Emission Natural Gas to Zero Emission $H_2$ Operation. MTZ Worldwide, vol. 2020-6, pp. 46-50, 2020.

Decarbonization and sustainability mandates pose serious uncertainties to the future of Internal Combustion Engines (ICEs).

Due to the challenges associated with combustion instabilities, the power density and efficiency of $H_2$ engines, also known as $H_2$ Internal Combustion Engines or $H_2$-ICEs, are much lower compared to that of Diesel engines.

Typical combustion issues with $H_2$ engines, defined as engines burning any fuel mixture combination that includes Natural Gas (NG), Ammonia ($NH_3$) and Hydrogen ($H_2$), or with carbon neutral fuels such as Methanol ($CH_3OH$), Ethanol ($C_2H_5OH$), synthetic gasoline, etc., are large variations in the Coefficient of Variation of Indicated Mean Effective Pressure (COV-IMEP), high propensity to Lubrication Oil Preignition (LOP), Knock and Preignition. Because of these limitations, only low levels of engine Indicated Mean Effective Pressure (IMEP) and Indicated Thermal Efficiency (ITE), and high levels of Nitrous Oxide (NOx) emissions can be obtained.

Current $H_2$-ICEs have performance parameters limited to the following ranges:

COV-IMEP>2%

IMEP≤16 bar

ITE≤41%

NOx≥100 mg/Nm3

However, the performance level needed for $H_2$-ICEs to compete with Hydrogen Fuel Cells would require performance parameters in the following ranges:

COV-IMEP≤1%

IMEP≥20 bar

ITE≥49%

NOx≤25 mg/Nm3

There is a need to address the foregoing deficiencies in the art.

IV. BRIEF DESCRIPTION OF THE DRAWINGS

V. DETAILED DESCRIPTION

Figure 1:
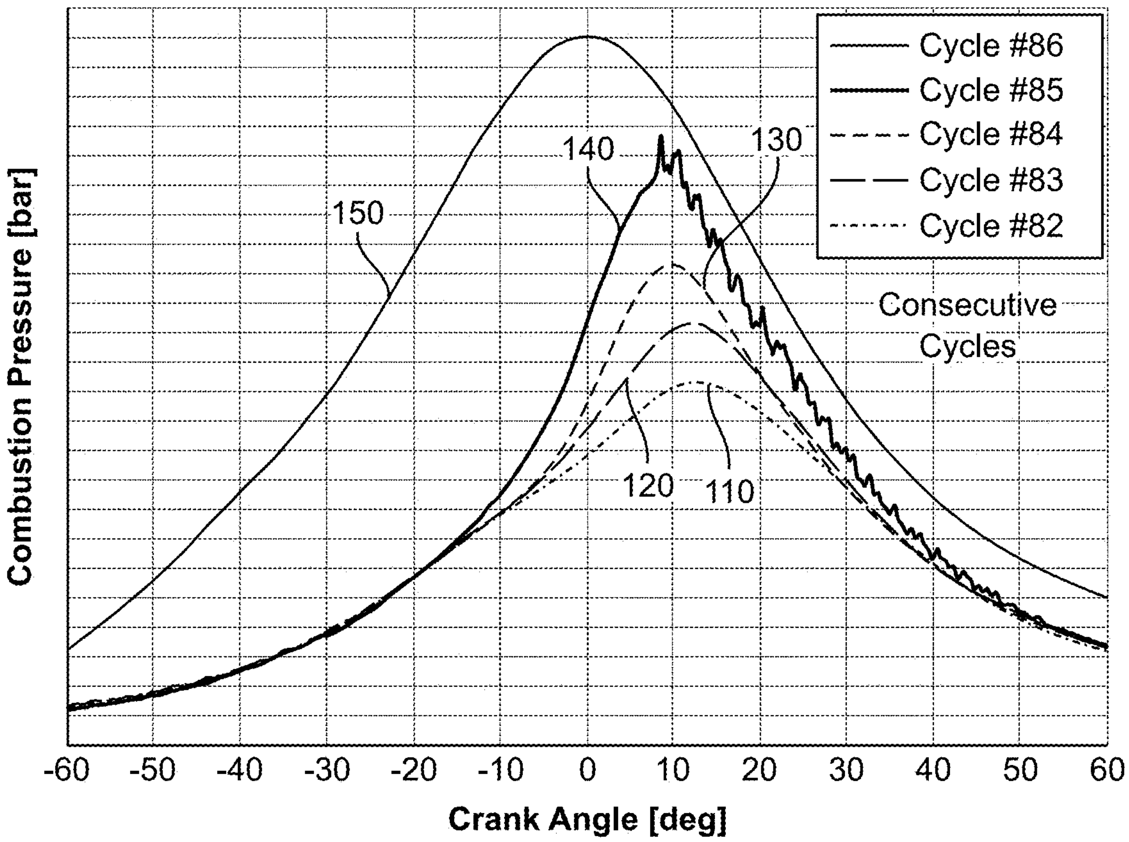
FIG. 1 depicts consecutive engine combustion cycles leading to backfire in the intake (frontfire) or preignition in accordance with certain embodiments.

In certain embodiments, achieving levels of competitive efficiency and power density with zero-emissions, may necessitate holistic system solutions including the key components of the engine system like ignition, injection, and combustion chamber which may be properly integrated to meet or exceed performance targets. Certain embodiments may be able to burn green fuels like Hydrogen ($H_2$) while having engine power densities and efficiencies approaching those of Diesel engines (i.e., "Diesel-like performance") but with net-zero emissions.

In certain embodiments, validated CFD simulation tools may be used to design highly effective mixing devices to assure proper mixing during steady state, as well as during transient operations. In certain embodiments, the proper mixing of injected Hydrogen ($H_2$) and/or Methanol ($CH_3OH$) may be achieved.

In certain embodiments, performance levels may be achieved to enable $H_2$-ICEs to compete against Hydrogen Fuel Cells. In certain embodiments, the following performance parameters may be achieved:

COV-IMEP≤1%

IMEP≥20 bar

ITE≥49%

NOx≤25 mg/Nm3

In certain embodiments, highly homogeneous mixtures defined as mixtures having a Uniformity Index (UI) greater than 0.9 may be used to achieve the foregoing performance levels. Where the UI=1−(Standard Deviation of Lambda/Mean Lambda).

$$UI = 1 - \frac{\lambda_{st\,dev}}{\lambda_{mean}}$$

$UI = 1$, means 100% homogenous.

In certain embodiments, a toroidal induction diffuser for enhancing mixing of engine intake air and fuel in an engine cylinder is disclosed comprising: an engine intake port having a first longitudinal axis; an engine intake runner upstream of the engine intake port having a second longitudinal axis; a toroidal structure located around one of the first longitudinal axis and the second longitudinal axis; wherein the toroidal structure includes a first one or more holes for introducing a first fuel flow into the engine intake port or the engine intake runner. The first fuel flow may be in one of a direction aligned with, counter to, or transverse to a direction of flow of intake air to the engine intake runner or engine intake port.

The toroidal induction diffuser may further comprise one or more cross branch structures extending radially from the toroidal structure to one of the engine intake port or the engine intake runner, wherein the one or more cross branch structures may comprise a second one or more holes for introducing a second fuel flow into the engine intake port or the engine intake runner. The second fuel flow may be in one of a direction aligned with, counter to, or transverse to an intake air flow direction into the engine intake runner or engine intake port. The first fuel flow may be counter to the intake air flow direction and the second fuel flow may be transverse to the intake air flow direction. The first fuel flow may be aligned with the intake air flow direction and the second fuel flow may be transverse to the intake air flow direction. The first fuel flow may be counter to the intake air flow direction and the second fuel flow may be counter to the intake air flow direction. The first fuel flow may be aligned with the intake air flow direction and the second fuel flow may be aligned with the intake air flow direction. The first fuel flow may be counter to the intake air flow direction and the second fuel flow may be aligned with the intake air flow direction. The first fuel flow may be aligned with the intake air flow direction and the second fuel flow may be counter to the intake air flow direction.

The toroidal structure may be symmetric about at least one of the first longitudinal axis, the second longitudinal axis, or the intake air flow direction. The size of and geometry of the toroidal structure may be functions of one or more of engine intake runner and port geometries, intake air flow direction, velocity and Reynolds number. The size of and the geometry of the one or more cross branch structures may be functions one or more of engine intake runner and port geometries, intake air flow direction, velocity and Reynolds number. A size of, a geometry of, a number of and an orientation of the first one or holes may be functions of one or more of engine intake runner and port geometries, intake air flow direction, velocity and Reynolds number. A size of, a geometry of, a number of and an orientation of the second one or more holes may be functions of one or more of engine intake runner and port geometries, intake air flow direction, velocity and Reynolds number.

The fuel may comprise at least one of $H_2$, $CH_3OH$, and $C_2H_5OH$. A fuel-air mixture in the engine cylinder may have a Uniformity Index (UI) greater than about 0.9 according to the following equation:

$$UI = 1 - \frac{\lambda_{st\,dev}}{\lambda_{mean}}$$

The fuel-air mixture in the engine cylinder may have a Uniformity Index (UI) of about 0.98.

In certain embodiments, FIG. 1 shows a sequence of consecutive engine combustion cycles leading to backfire in the intake (i.e., frontfire). In certain embodiments, Cycle #82 110 shows a normal cycle. In certain embodiments Cycle #83 120 shows an advanced start of combustion (SOC) which may be caused by either hot spots from improper management of high energy ignition or by lube oil preignition (LOP). In certain embodiments, Cycle #84 130 shows an enhanced combustion Heat Released Rate cycle that may be caused by hot spots from the previous advanced SOC cycle 120. In certain embodiments, Cycle #85 140 shows knock that may be caused by high temperatures from the preceding high combustion cycle 130. In certain embodiments, Cycle #86 150 shows frontfire or preignition. This type of combustion instability may be typical in $H_2$ engines and may prevent reliable operation at higher power densities above 16 bar brake mean effective pressure (BMEP). In certain embodiments, the instability may be initiated by an advanced start of combustion (SOC) cycle, which may be caused by either hot spots from improper management of high energy ignition sparks or by the autoignition of lubricating oil droplets and may result in large cycle to cycle combustion variabilities.

In certain embodiments, the power density of an $H_2$ engine may be less than 60% of its Diesel counterpart due to these combustion instabilities. For example, if the base Diesel engine operates at 25 bar BMEP (brake mean effective pressure), the $H_2$ engine version may operate at less than 15 bar BMEP before the combustion becomes unstable. Accordingly, if for the Diesel version the engine efficiency is in the range of 48%, in the $H_2$ version the engine efficiency may be in the range of 40%.

Figure 2:
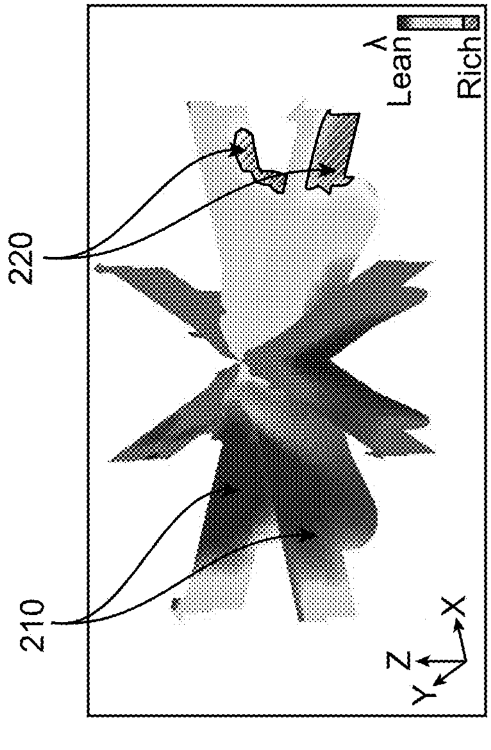
FIG. 2 depicts heterogenous in-cylinder mixture air-fuel Lambda (λ) distribution with a conventional $H_2$ PFI system in accordance with certain embodiments.

As discussed in references [1]-[8] above, homogenous $H_2$ mixtures may prevent the occurrence of LOP at BMEP levels above 16 bar. Combustion CFD studies, as well as engine testing, have indicated that it is very difficult to thoroughly mix $H_2$ with air. This may be due to the incredibly small molecular mass of $H_2$ which limits the diffusion of $H_2$ in air, resulting in highly stratified mixing with conventional $H_2$ port fuel injection (PFI) systems, as shown in FIG. 2. In certain embodiments, $H_2$-lean pockets 210 and $H_2$-rich pockets 220 may be created. In embodiments, $H_2$-rich pockets 220, especially if located at the periphery of the cylinder where the concentration of lubricating oil tends to be higher, may result in LOP causing combustion instability in the form of abnormal high cylinder pressure cycles.

Figure 3:
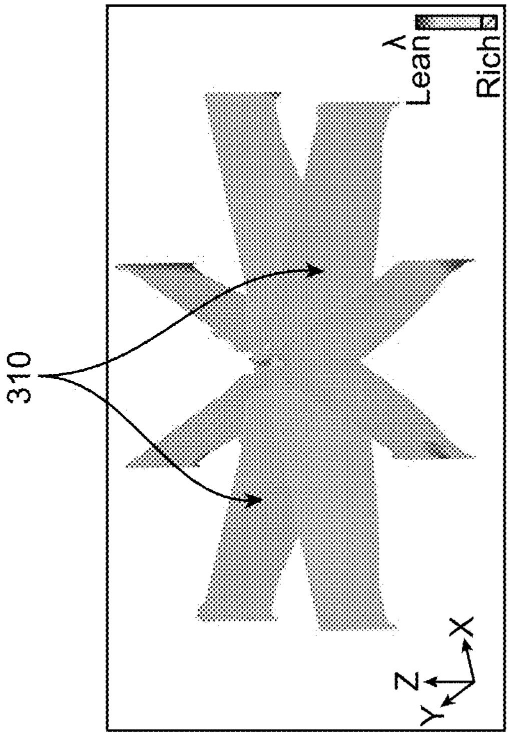
FIG. 3 depicts homogeneous in-cylinder mixture λ distribution with advanced $H_2$ mixing system in accordance with certain embodiments.

In contrast, certain embodiments shown in FIG. 3 may provide a more homogeneous in-cylinder $H_2$ mixture 310 Lambda (2=Actual Air-Fuel ratio/Stoichiometric Air-Fuel ratio), with leaner pockets in the periphery where lubricating oil is present. In these embodiments, the propagation of a flame front initiated by the local autoignition of the lubricating oil may be inhibited by the lean mixture which then may prevent combustion instabilities due, for example, to LOP. In certain embodiments, port fuel injection (PFI) injector diffuser induction devices may be used to achieve the necessary mixture homogeneity and, hence, to achieve the target power density and efficiency with $H_2$-ICEs.

In certain embodiments, a PFI diffuser induction device may use the principle of toroidal vortex flow to thoroughly mix $H_2$ and air in the intake runner and port of a $H_2$-ICE. Toroidal vortices in liquids and gases may enable thorough mixing in a two-component system, which in certain embodiments may include air and hydrogen. When $H_2$ enters a stream of air flow in the form of a toroidal vortex, it may tend to swallow the air into the vortex where a low-pressure region may be formed due to the swirling velocity of the vortex. This method of mixing may be more effective that the typical mixing via conventional injection.

Figure 4:
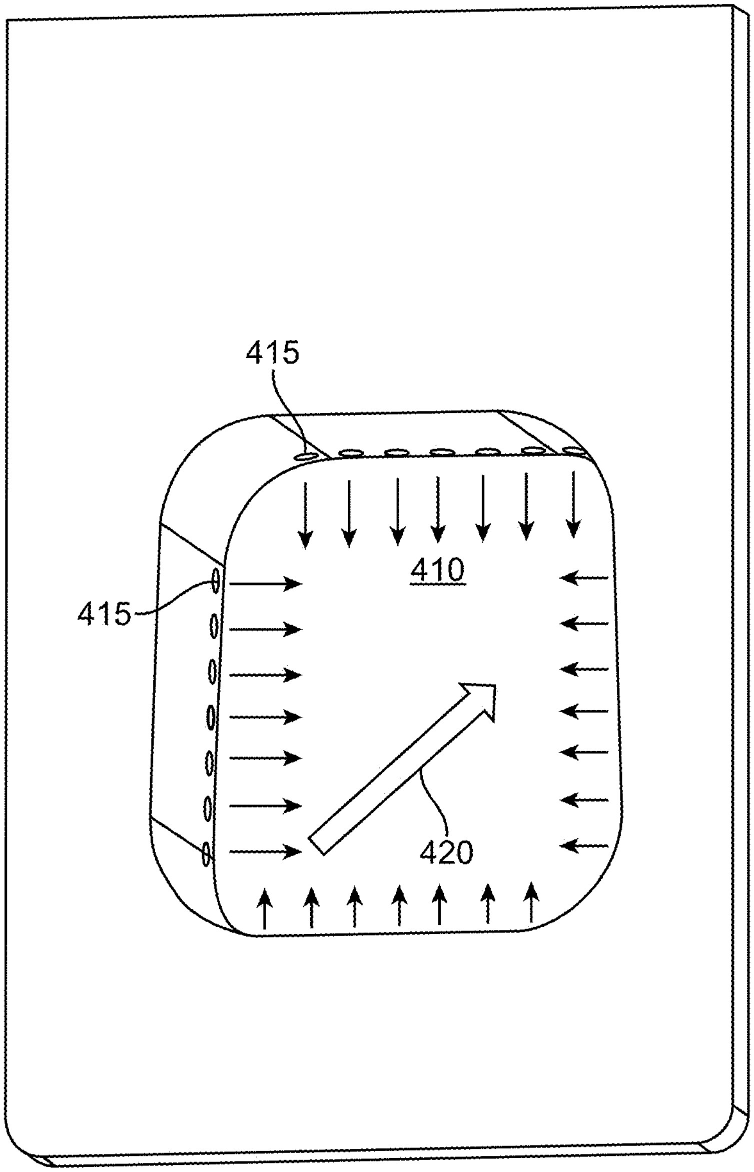
FIG. 4 depicts an injection diffuser induction device having the fuel admission at the periphery of the intake runner in accordance with certain embodiments.

In certain embodiments shown in FIG. 4, an injection diffuser induction device with air intake direction 420, may be characterized by having the fuel admission 410 at the periphery of the intake runner via injection through multiple holes 415. In these embodiments, while the pressure drop across the diffuser may be minimized, the mixing may not be sufficiently homogeneous to achieve the required combustion stability target.

Figure 5:
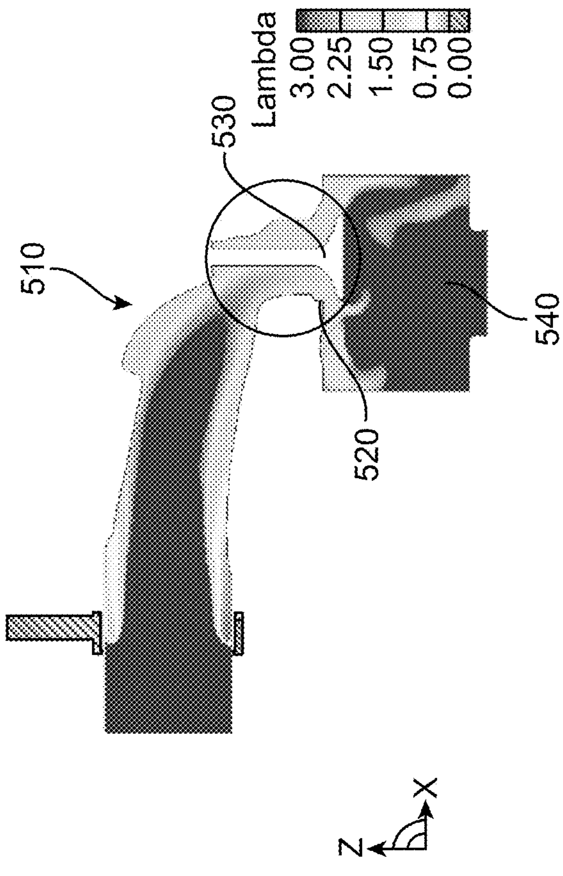
FIG. 5 depicts CFD simulation of heterogenous mixing in the intake port of an injection diffuser with fuel admission at the periphery of the intake runner in accordance with certain embodiments.

In certain embodiments, FIG. 5 shows a CFD simulation of the mixing in the intake port 510 of an $H_2$ engine showing that the mixture Lambda distribution 520 at the intake valve 530, prior to entering the engine cylinder 540, is not very uniform. In these embodiments, due to this inhomogeneity in the intake port 510, the mixing in the cylinder may also be nonuniform as shown in piston side view 610 and cylinder head view from piston 620 of FIG. 6, with a UI of approximately 0.9. In certain embodiments, this kind of inhomogeneity, having a UI~ 0.9, may cause combustion instabilities like LOP which limit the engine operation to power density below 16 bar brake mean effective pressure (BMEP) as shown by extensive engine testing.

Figure 8:
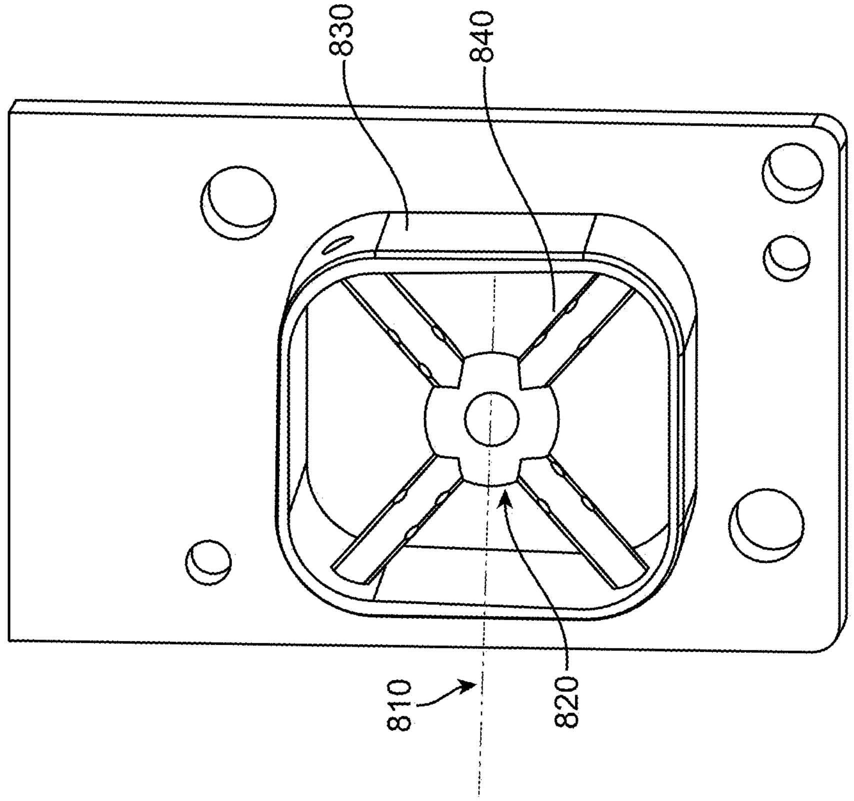
FIG. 8 depicts an injection diffuser induction device having the fuel admission at the center of the intake runner or intake port in accordance with certain embodiments.
Figure 7:
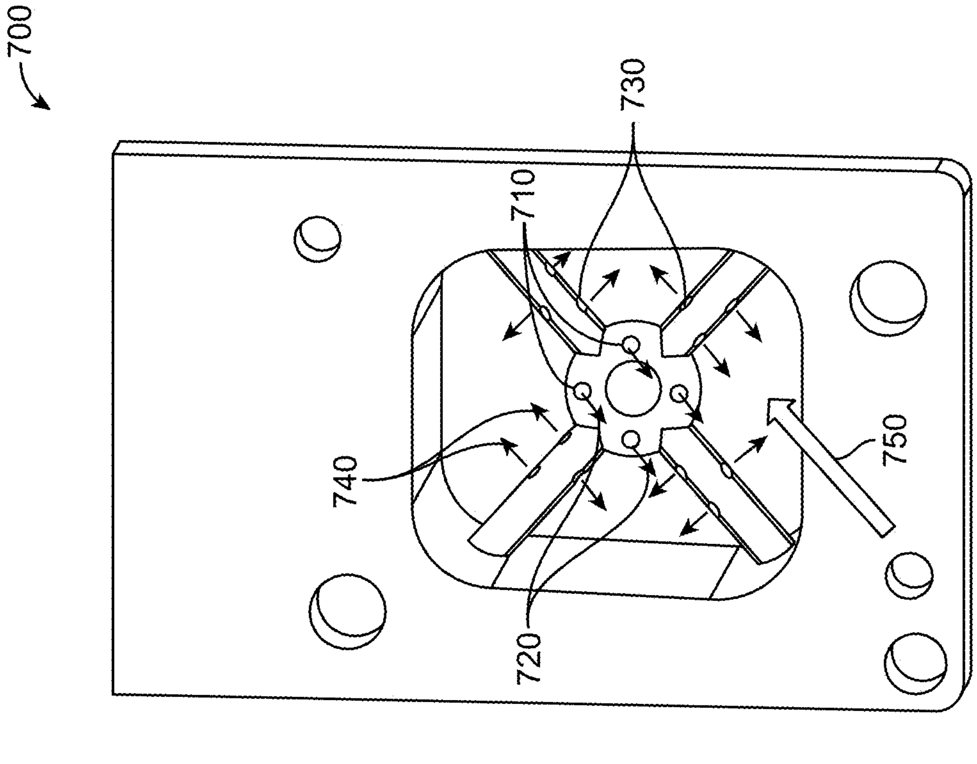
FIG. 7 depicts an injection diffuser induction device having the fuel admission at the center of the intake runner or intake port in accordance with certain embodiments.

In certain embodiments as shown in FIGS. 7 and 8, a toroidal injection diffuser induction device 700 may improve mixing by admitting fuel, for example $H_2$, from the center of the intake runner or intake port 830, utilizing a toroidal structure 820 suspended about the center of the engine intake runner or port 830. Unlike peripheral diffusers as shown in FIG. 4, the fuel, for example $H_2$, may be induced from a central toroidal structure 820 having substantially radial cross branch structures 840 flow dynamically connected to the centrally located toroidal structure 820. The centrally located toroidal structure 820 may have holes 710 delivering fuel 720 where the fuel flow may be concurrent, counter or transversal to the intake air flow 750 delivering the fuel streams in multiple directions. The radial cross branch structures 840 may have holes 730 delivering fuel 740 where the fuel flow may be concurrent, counter or transversal to the intake air flow 750 delivering the fuel streams in multiple directions. In certain embodiments, the direction of the fuel 720 released from the central toroidal structure 820 and the direction of the fuel 740 released from the cross branches 840 may be counter, concurrent, transversal or combinations of the said directions with respect to the direction of the intake air 750 stream. In the embodiment of FIGS. 7 and 8, the directions of the fuel streams 740 delivered from the central toroidal structure 820 may be counter or concurrent to the air stream direction 750 and the direction of the fuel streams 740 delivered from the cross branches 840 may be transverse to the direction of the intake air stream 750.

The arrangement shown in the embodiments of FIGS. 7 and 8 may enable the formation of a toroidal vortex flow in the midstream of the intake air flow 750 thereby enabling thorough mixing of hard-to-mix fuels. Hard-to-mix fuels may include Hydrogen ($H_2$, due to the very small molecular mass, or $CH_3OH$ (Methanol), and $C_2H_5OH$ (Ethanol), due to the relatively high viscosity and high latent heat of vaporization, and other gaseous and liquid fuels known to one of skill in the art. In certain embodiments, the lateral holes 730 located on the cross branches 840 and creating a fuel flow 740 that is approximately orthogonal to the direction of the intake air, may enable further mixing at the periphery of the intake channel.

In certain embodiments with reference to FIG. 8, the general geometrical configuration of this injection diffuser induction device 700, may be substantially symmetrical about the longitudinal axis 810 of the intake runner 830 or to the direction of the intake air stream 750 in order to promote uniform diffusion of the fuel in the intake air stream.

In certain embodiments with reference to FIG. 8, a) the size and geometry of the central toroidal structure 820 and of the cross branches 840, b) the size, geometry, number, orientation and location of the discharge orifices 710 on the central toroidal structure 820 and of the discharge orifices 730 on the cross branches 840, and c) the number of the cross branches 840 may be functions of the engine intake runner and port 830 geometries, intake air flow direction 750, velocity and Reynolds number (defined as Re=p u dh/u where p is the air density, u is the air velocity, the dh is the intake runner hydraulic diameter, and u is the air dynamic viscosity), injection pressure and duration and may be determined by means of a computational fluid dynamic (CFD) numerical tool that may be based on empirically validated physical models which may be representative of each engine type and application.

Figure 9:
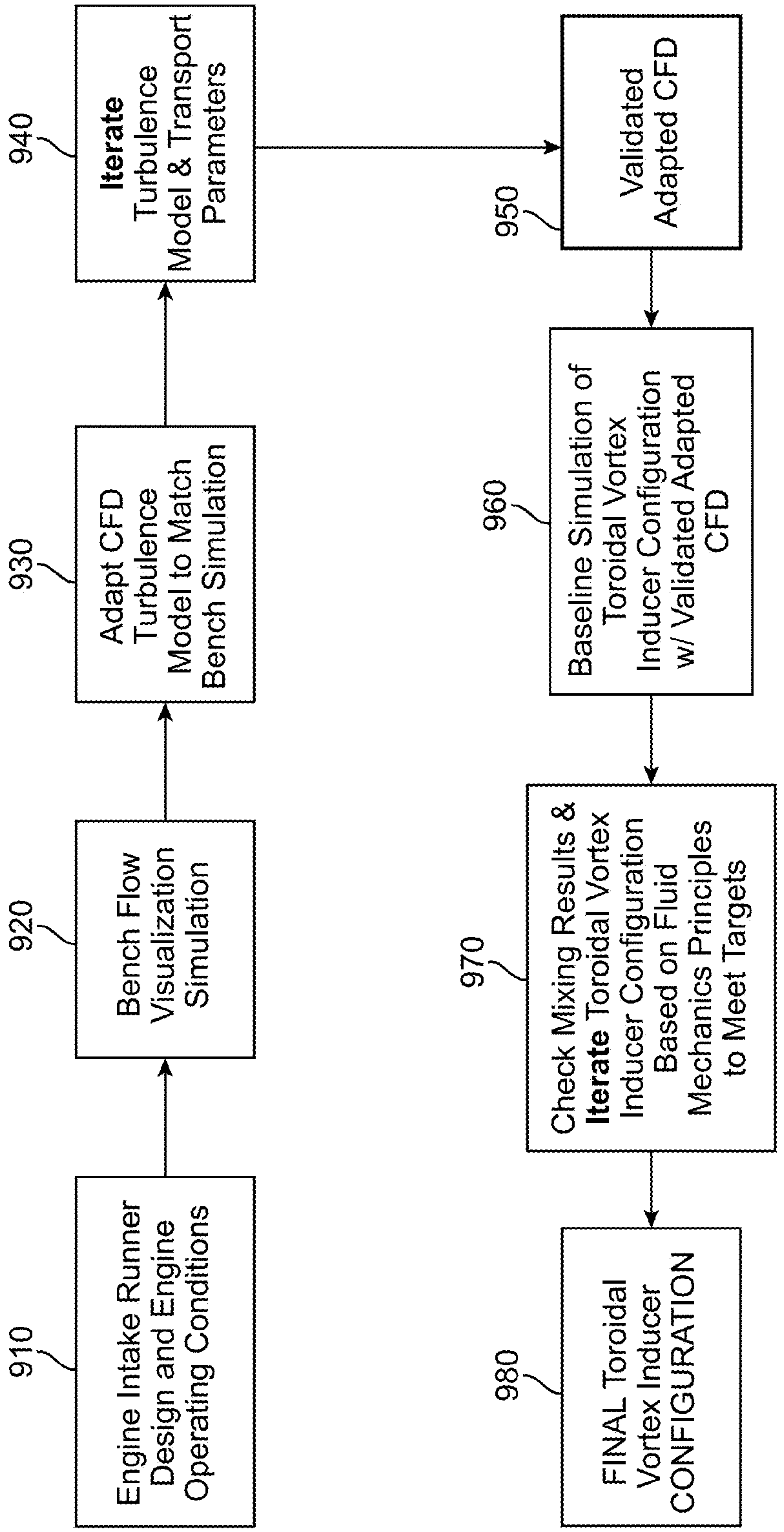
FIG. 9 depicts a flow chart of the criteria and methodology to validate the CFD tool used to define the general configuration of the Toroidal Vortex Diffuser in relation to the engine intake runner and port geometries, the intake air flow direction, velocity and Reynolds number in accordance with certain embodiments.

In certain embodiments, FIG. 9 is a flow chart of the process of validating a CFD tool that may be used to define the general configuration of the Toroidal Vortex Induction Diffuser in relation to the engine intake runner and port geometries, and intake air flow direction, velocity and Reynolds number.

In certain embodiments as shown in Step 910, Engine Design and Operating Conditions may be input. In certain embodiments, a CFD turbulence model such as RNG Zeta-F or Reynolds Stress Model or Detached Eddies Simulation (DES) or Large Eddies Simulation (LES) may be adapted and the transport parameters for mass and heat such as Prandtl and Schmidt numbers may be adapted to the specific engine characteristics such as a) cylinder bore & stroke, b) engine rpm, c) intake runner geometry, d) Lambda, e) fuel type, and f) fuel injector geometry, to match the empirical data from bench flow visualization testing simulating engine operations as step 930 for each application segment such as industrial, marine and heavy duty on-off highway.

In certain embodiments, the adapted CFD turbulence model may be used to simulate the intake and compression processes in terms of flow and Lambda distribution. In certain embodiments as shown in Step 920, a first simulation of the current engine configuration may be conducted to establish a baseline. In certain embodiments, the target improvements in terms of mixture homogeneity and required mixing levels may be formulated based on results of the simulation. In certain embodiments, a strategy may be defined to achieve the targeted improvements in terms of type and geometry of the injector, injection pressure and duration, and Toroidal Vortex Induction Diffuser design and location in the intake runner or port. In certain embodiments as shown in Step 940, iterative simulations of the configuration resulting from the initial strategy may be conducted and the results may be analyzed in terms of mixture homogeneity to arrive at validated adapted CFD 950. In certain embodiments as shown in step 960, a baseline simulation of the toroidal vortex inducer configuration may be conducted using validated adapted CFD 950. Certain embodiments as shown in step 970 may further improve the system in terms of Toroidal Vortex Induction Diffuser design and location in the intake runner or port and injector design and location in the intake runner or port as needed based on fundamental fluid mechanics principles based on results of the iterative simulations to arrive at final toroidal vortex inducer configuration 980.

Figure 10:
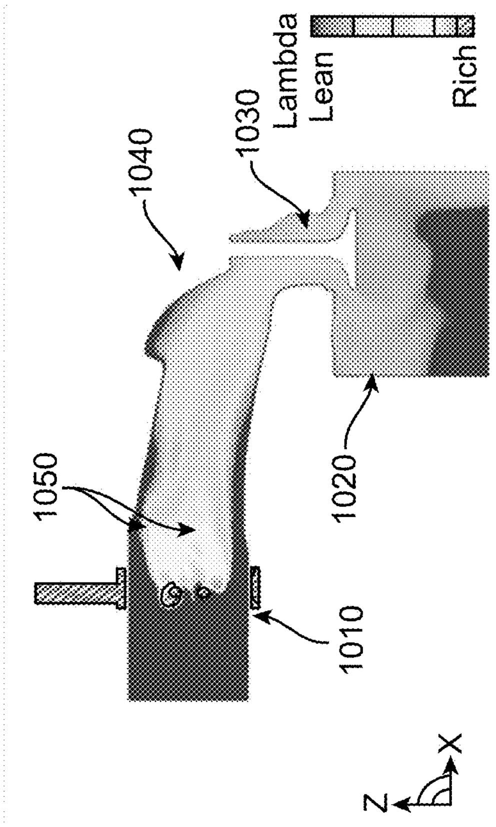
FIG. 10 depicts a CFD simulation of toroidal vortex flow diffusing lean Lambda mixture through intake port and valve into the engine cylinder in accordance with certain embodiments.

In certain embodiments, FIG. 10 shows validated CFD simulation results for a toroidal vortex diffuser. In certain embodiments during the intake process, the toroidal vortex flow 1050 located at the center of the intake runner 1010 may diffuse lean mixture Lambda through intake port 1040 and valve 1030 into engine cylinder 1020.

Figure 11:
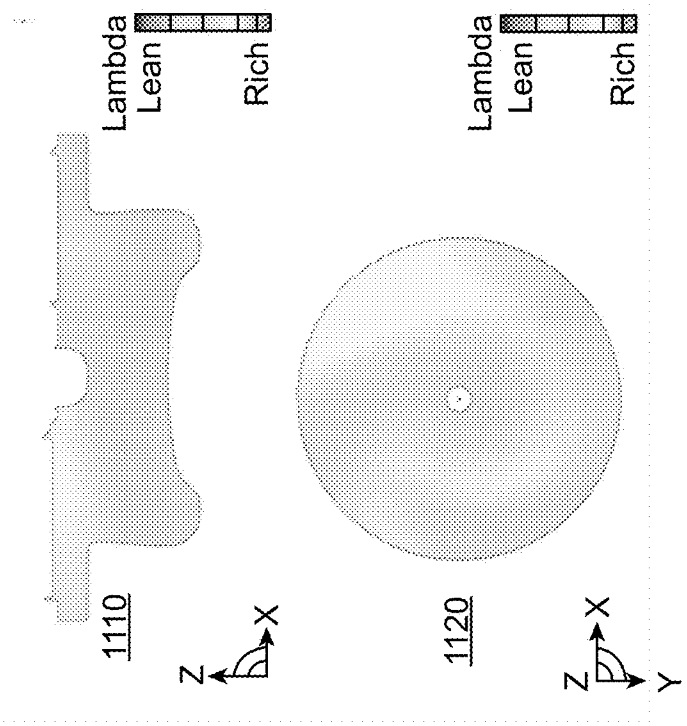
FIG. 11 depicts CFD simulation results for the in-cylinder Lambda distribution resulting from the Toroidal Vortex Induction Diffuser in accordance with certain embodiments.

In certain embodiments, FIG. 11 shows a piston side view 1110 and a cylinder head view 1120 from piston of CFD simulation results for the in-cylinder Lambda distribution resulting from a toroidal vortex induction diffuser.

Figure 6:
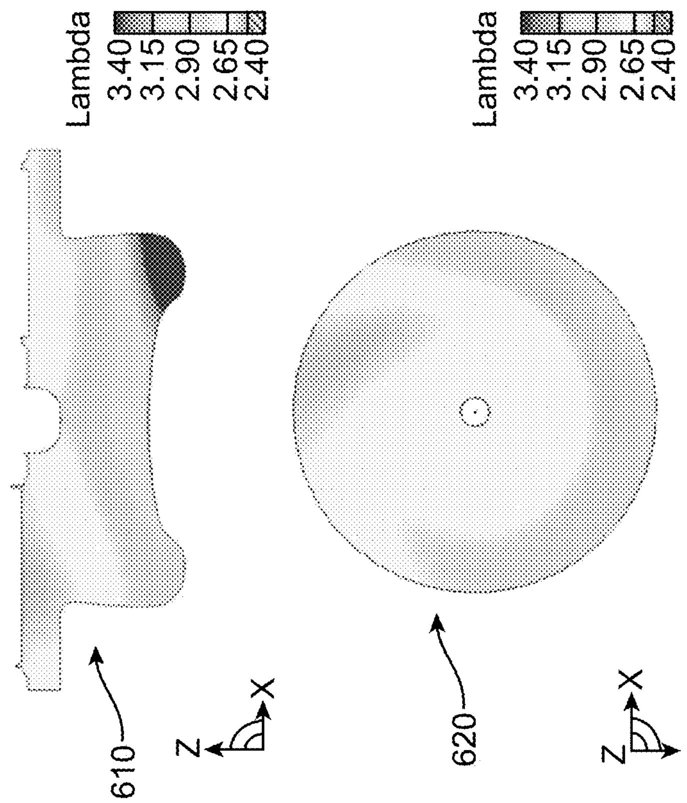
FIG. 6 depicts CFD simulation of heterogenous in-cylinder mixing of an injection diffuser with fuel admission at the periphery of the intake runner in accordance with certain embodiments.

In certain embodiments with the Toroidal Vortex Induction Diffuser, the in-cylinder mixture Lambda distribution may be nearly homogeneous with a uniformity index UI=0.98, which is a substantial improvement compared to the peripheral induction diffuser portrayed in FIGS. 4, 5, and 6 and having a UI=0.9.

Figure 12:
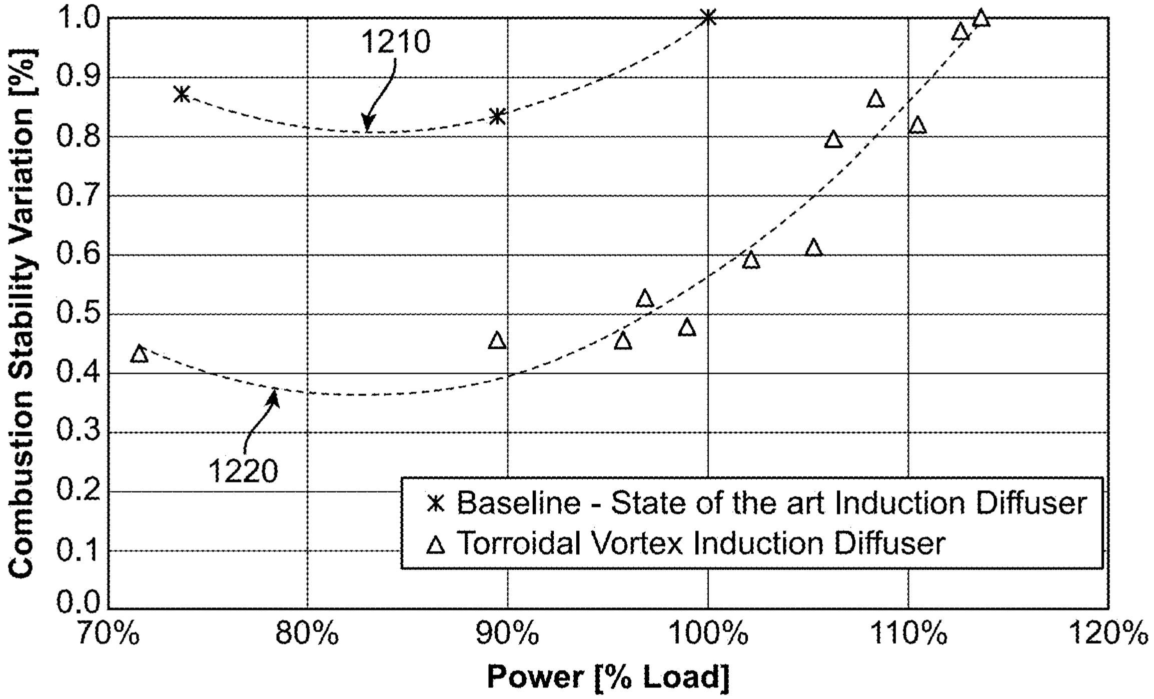
FIG. 12 depicts engine test measurements for a counter-flow Toroidal Vortex Induction Diffuser compared to a conventional induction diffuser in accordance with certain embodiments.

In certain embodiments, FIG. 12 shows engine measurement data describing the relationship between the combustion stability variation [%], in terms of LOP intensity and frequency of occurrence, calculated as coefficient of variation of indicated mean effective pressure (COVIMEP [%]), and engine power output [KW] for engine test results of the Toroidal Vortex Induction Diffuser 1220 compared to a conventional Induction Diffuser 1210 As shown in FIG. 12, the Toroidal Vortex Induction Diffuser 1220 combustion stability may be substantially increased resulting in a power output improvement of approximately 14% measured at 1% combustion stability variation.

Figure 13:
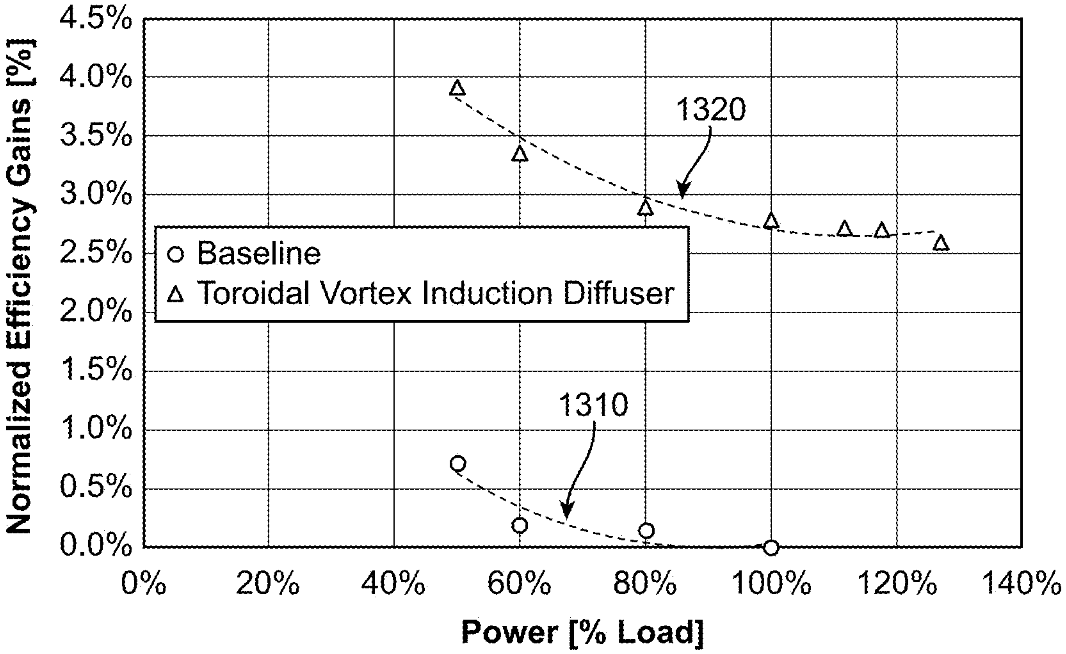
FIG. 13 depicts engine test measurements for a counter-flow Toroidal Vortex Induction Diffuser compared to a conventional induction diffuser in accordance with certain embodiments.

In certain embodiments, FIG. 13 shows engine measurement data describing the relationship between efficiency, calculated as Normalized Efficiency Gains [%], and Power [% Load] for engine test results of the Toroidal Vortex Induction Diffuser 1320 compared to a conventional Induction Diffuser 1310. As shown in FIG. 13, the Toroidal Vortex Induction Diffuser 1320 may enable better than 3% engine efficiency, measured in brake thermal efficiency (BTE), and more than 25% in power output. In certain embodiments, engine test measurements showing remarkable improvements in engine efficiency and power output enabled by a novel counterflow Toroidal Vortex Induction Diffuser achieving high levels of fuel mixture homogeneity in combustion engines using hard to mix fuels like $H_2$, $CH_3OH$, $C_2H_5OH$ and other gaseous and liquid fuels.

In certain embodiments, a conventional Induction Diffuser may admit fuel laminarly at the periphery of the intake channel resulting in poor mixing, whereas a Toroidal Vortex Induction Diffuser may admit fuel in the center of the intake runner with a toroidal vortex flow which enables thorough mixing of the injected fuel with the intake air. In certain embodiments, the toroidal vortex flow may result in a highly homogeneous mixture being created inside the cylinder which may enable improvement in engine combustion stability, power output, engine efficiency and transient response. In certain embodiments, improvements in engine efficiency (BTE) and transient response to load changes are expected to follow the trend of the improvements measured in power output.

While the invention has been described with reference to the specific embodiments thereof, it should be understood by those skilled in the art that various changes may be made, and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not a limitation of the invention.

We claim:

1. A toroidal induction diffuser for enhancing mixing of engine intake air and fuel in an engine cylinder, comprising:

an engine intake port having a first longitudinal axis;

an engine intake runner upstream of the engine intake port having a second longitudinal axis;

a toroidal structure located around one of the first longitudinal axis and the second longitudinal axis;

wherein the toroidal structure includes a first one or more holes for introducing a first fuel flow into the engine intake port or the engine intake runner; and one or more cross branch structures extending radially from the toroidal structure to one of the engine intake port or the engine intake runner, wherein the one or more cross branch structures comprise a second one or more holes for introducing a second fuel flow into the engine intake port or the engine intake runner.

2. The toroidal induction diffuser of claim 1, wherein the first fuel flow is in one of a direction aligned with, counter to, or transverse to a direction of flow of intake air to the engine intake runner or engine intake port.

3. The toroidal induction diffuser of claim 1, wherein the second fuel flow is in one of a direction aligned with, counter to, or transverse to an intake air flow direction into the engine intake runner or engine intake port.

4. The toroidal induction diffuser of claim 1, wherein the first fuel flow is counter to the intake air flow direction and the second fuel flow is transverse to the intake air flow direction.

5. The toroidal induction diffuser of claim 1, wherein the first fuel flow is aligned with the intake air flow direction and the second fuel flow is transverse to the intake air flow direction.

6. The toroidal induction diffuser of claim 1, wherein the first fuel flow is counter to the intake air flow direction and the second fuel flow is counter to the intake air flow direction.

7. The toroidal induction diffuser of claim 1, wherein the first fuel flow is aligned with the intake air flow direction and the second fuel flow is aligned with the intake air flow direction.

8. The toroidal induction diffuser of claim 1, wherein the first fuel flow is counter to the intake air flow direction and the second fuel flow is aligned with the intake air flow direction.

9. The toroidal induction diffuser of claim 1, wherein the first fuel flow is aligned with the intake air flow direction and the second fuel flow is counter to the intake air flow direction.

10. The toroidal induction diffuser of claim 1, wherein the toroidal structure is symmetric about the first longitudinal axis, the second longitudinal axis, or the intake air flow direction.

11. The toroidal induction diffuser of claim 1, wherein the size of and geometry of the toroidal structure are functions of one or more of engine intake runner and port geometries, intake air flow direction, velocity and Reynolds number.

12. The toroidal induction diffuser of claim 1, wherein a size of and a geometry of the one or more cross branch structures are functions of one or more of engine intake runner and port geometries, intake air flow direction, velocity and Reynolds number.

13. The toroidal induction diffuser of claim 1, wherein a size of, a geometry of, a number of and an orientation of the first one or holes are functions of one or more of engine intake runner and port geometries, intake air flow direction, velocity and Reynolds number.

14. The toroidal induction diffuser of claim 1, wherein a size of, a geometry of, a number of and an orientation of the second one or more holes are functions of one or more of engine intake runner and port geometries, intake air flow direction, velocity and Reynolds number.

15. The toroidal induction diffuser of claim 1, wherein the fuel comprises at least one of $H_2$, $CH_3OH$, and $C_2H_5OH$.

16. The toroidal induction diffuser of claim 1, wherein a fuel-air mixture in the engine cylinder has a Uniformity Index (UI) greater than about 0.9 according to the following equation:

$$UI = 1 - \frac{\lambda_{st\,dev}}{\lambda_{mean}}.$$

17. The toroidal induction diffuser of claim 16, wherein the fuel-air mixture in the engine cylinder has a Uniformity Index (UI) of about 0.98.

18. The toroidal induction diffuser of claim 1, wherein a fuel-air mixture in the engine cylinder has a Uniformity Index (UI) greater than about 0.9 according to the following equation:

$$UI = 1 - \frac{\lambda_{st\,dev}}{\lambda_{mean}}.$$

19. The toroidal induction diffuser of claim 18, wherein the fuel-air mixture in the engine cylinder has a Uniformity Index (UI) of about 0.98.

* * * * *